United States Patent [19]

Nickerson et al.

[11] Patent Number: 5,869,164
[45] Date of Patent: Feb. 9, 1999

[54] PRESSURE-COMPENSATING COMPOSITIONS AND PADS MADE THEREFROM

[75] Inventors: Lincoln P. Nickerson, Nederland; David L. Howard, Lakewood; David C. Baumgartner, Boulder; Richard R. Runkles, Longmont; Jeremy M. Lemaire, Boulder, all of Colo.

[73] Assignee: RIK Medical LLC

[21] Appl. No.: 746,247

[22] Filed: Nov. 7, 1996

Related U.S. Application Data

[60] Provisional application No. 60/006,383 Nov. 8, 1995.

[51] Int. Cl.$^6$ .................................................... B32B 1/04
[52] U.S. Cl. .......................... 428/76; 297/459; 428/68; 428/920; 428/921; 524/860
[58] Field of Search ............................. 428/76, 68, 920, 428/921; 524/860; 297/459

[56] References Cited

U.S. PATENT DOCUMENTS

| | | | |
|---|---|---|---|
| 2,797,201 | 6/1957 | Veatch et al. | 260/2.5 |
| 2,885,360 | 5/1959 | Haden et al. | 252/28 |
| 3,237,319 | 3/1966 | Hanson | 36/2.5 |
| 3,308,491 | 3/1967 | Spence | 5/348 |
| 3,325,920 | 6/1967 | Werner et al. | 36/2.5 |
| 3,365,315 | 1/1968 | Beck et al. | 106/40 |
| 3,374,561 | 3/1968 | Werner et al. | 36/2.5 |
| 3,402,411 | 9/1968 | Hanson | 12/142 |
| 3,407,406 | 10/1968 | Werner et al. | 2/3 |
| 3,449,844 | 6/1969 | Spence | 36/44 |
| 3,524,794 | 8/1970 | Jonnes et al. | 161/60 |
| 3,548,420 | 12/1970 | Spence | 3/20 |
| 3,552,044 | 1/1971 | Wiele | 36/71 |
| 3,582,503 | 6/1971 | Horne | 260/2.5 |
| 3,607,332 | 9/1971 | Wingfield | 106/243 |
| 3,607,601 | 9/1971 | Milam | 264/46 |
| 3,615,972 | 10/1971 | Morehouse et al. | 156/276 |
| 3,635,849 | 1/1972 | Hanson | 36/2.5 |
| 3,663,973 | 5/1972 | Spence | 5/348 |
| 3,689,948 | 9/1972 | Graves et al. | 5/348 |
| 3,721,232 | 3/1973 | Trenchard | 5/348 |
| 3,736,612 | 6/1973 | Check et al. | 36/2.5 |
| 3,737,930 | 6/1973 | Smith | 5/348 |
| 3,778,104 | 12/1973 | Kusters | 297/458 |
| 3,789,442 | 2/1974 | Tobnick | 5/348 |
| 3,798,799 | 3/1974 | Hanson et al. | 36/2.5 |
| 3,803,647 | 4/1974 | Reswick | 5/348 |
| 3,810,265 | 5/1974 | McGrew | 5/348 |
| 3,822,138 | 7/1974 | Noguchi et al. | 5/345 |
| 3,858,379 | 1/1975 | Graves et al. | 252/8.55 D |
| 3,862,044 | 1/1975 | Christopher et al. | 12/142 |
| 3,882,561 | 5/1975 | Hanson et al. | |
| 3,923,705 | 12/1975 | Smith | 521/154 |
| 3,934,285 | 1/1976 | May | 5/345 |
| 3,937,678 | 2/1976 | Yasuda et al. | 106/229 |
| 3,968,530 | 7/1976 | Dyson | 5/338 |
| 4,019,209 | 4/1977 | Spence | 3/36 |
| 4,026,835 | 5/1977 | Lee et al. | 521/154 |
| 4,026,842 | 5/1977 | Lee et al. | 521/154 |
| 4,038,762 | 8/1977 | Swan | 36/89 |
| 4,055,866 | 11/1977 | Evans | 5/367 |
| 4,064,565 | 12/1977 | Griffiths | 2/412 |
| 4,072,635 | 2/1978 | Jeram | 260/2.5 |
| 4,083,127 | 4/1978 | Hanson | 36/93 |
| 4,104,073 | 8/1978 | Koide | 106/18 |
| 4,108,928 | 8/1978 | Swan | 264/26 |
| 4,144,658 | 3/1979 | Swan | 36/117 |
| 4,193,149 | 3/1980 | Welch | 5/447 |
| 4,206,524 | 6/1980 | Cook | 5/468 |
| 4,207,635 | 6/1980 | Leroy | 5/437 |
| 4,229,546 | 10/1980 | Swan | 521/55 |
| 4,243,754 | 1/1981 | Swan | 521/51 |
| 4,252,910 | 2/1981 | Schaefer | 521/145 |
| 4,255,202 | 3/1981 | Swan | 106/122 |
| 4,255,824 | 3/1981 | Pertchik | 5/441 |
| 4,286,013 | 8/1981 | Daroga et al. | 428/266 |
| 4,297,755 | 11/1981 | Mollura | 5/455 |
| 4,380,569 | 4/1983 | Shaw | 428/283 |
| 4,387,176 | 6/1983 | Freye | 524/268 |
| 4,388,358 | 6/1983 | Davis et al. | 428/71 |
| 4,425,676 | 1/1984 | Crane | 5/450 |
| 4,441,905 | 4/1984 | Malmendier et al. | 65/21.3 |
| 4,456,642 | 6/1984 | Burgdorfer | 428/68 |
| 4,460,740 | 7/1984 | Arai | 524/74 |
| 4,463,464 | 8/1984 | Bost et al. | 5/459 |
| 4,463,465 | 8/1984 | Parker et al. | 5/453 |
| 4,483,029 | 11/1984 | Paul | 5/453 |
| 4,485,505 | 12/1984 | Paul | 5/449 |
| 4,498,205 | 2/1985 | Hino | 5/459 |
| 4,504,991 | 3/1985 | Klancnik | 252/606 |
| 4,521,333 | 6/1985 | Graham et al. | 5/453 |
| 4,525,885 | 7/1985 | Hunt et al. | 252/573 |
| 4,556,511 | 12/1985 | Nishigaki et al. | 5/236 |
| 4,559,656 | 12/1985 | Foster | 267/8 |
| 4,576,366 | 3/1986 | Gallas et al. | 350/96.34 |
| 4,618,213 | 10/1986 | Chen | 524/296 |
| 4,639,483 | 1/1987 | Billigmeier et al. | 428/246 |
| 4,668,564 | 5/1987 | Orchard | 428/251 |
| 4,690,859 | 9/1987 | Porter et al. | |
| 4,701,016 | 10/1987 | Gartside et al. | 350/96.23 |
| 4,719,251 | 1/1988 | Dietlein et al. | 523/218 |
| 4,728,551 | 3/1988 | Jay | 428/76 |
| 4,756,851 | 7/1988 | Billigmeier et al. | 252/572 |
| 4,770,648 | 9/1988 | Gillis | 36/43 |
| 4,801,493 | 1/1989 | Ferziger | 428/442 |
| 4,810,395 | 3/1989 | Levy et al. | 252/28 |
| 4,822,603 | 4/1989 | Farris et al. | 424/66 |
| 4,828,542 | 5/1989 | Hermann | 604/3 |
| 4,853,214 | 8/1989 | Orr | 424/69 |
| 4,856,626 | 8/1989 | Nakanishi | 188/371 |

(List continued on next page.)

FOREIGN PATENT DOCUMENTS 1556612   11/1979   United Kingdom .

Primary Examiner—Nasser Ahmad
Attorney, Agent, or Firm—Donald E. Egan

[57] ABSTRACT

A pressure compensating padding device comprising a flexible envelope and a deformable composition within said envelope, wherein said composition deforms in response to continuously applied pressure; but tends to maintain its shape and position in the absence of applied pressure; said composition comprising a fluid formed from a mixture of an oil and a thickener, wherein said composition maintains its fluid characteristic.

108 Claims, No Drawings

U.S. PATENT DOCUMENTS

| | | | |
|---|---|---|---|
| 4,861,804 | 8/1989 | Nakanishi | 524/54 |
| 4,863,721 | 9/1989 | Beck et al. | 424/74 |
| 4,871,795 | 10/1989 | Pawar | 524/267 |
| 4,952,439 | 8/1990 | Hanson | 428/72 |
| 4,961,891 | 10/1990 | Pitolaj | 264/113 |
| 4,966,929 | 10/1990 | Tomoshige et al. | 524/71 |
| 4,974,820 | 12/1990 | Nakanishi | 267/152 |
| 4,990,552 | 2/1991 | Mori et al. | 524/176 |
| 5,005,575 | 4/1991 | Geri | 36/43 |
| 5,015,313 | 5/1991 | Drew et al. | 156/87 |
| 5,054,753 | 10/1991 | Polus | 36/35 |
| 5,058,291 | 10/1991 | Hanson | 428/68 |
| 5,093,138 | 3/1992 | Drew et al. | 36/117 |
| 5,100,712 | 3/1992 | Drew et al. | 428/68 |
| 5,101,580 | 4/1992 | Lyden | 36/93 |
| 5,131,174 | 7/1992 | Drew et al. | 36/35 |
| 5,138,722 | 8/1992 | Urella et al. | 362/209 |
| 5,147,685 | 9/1992 | Hanson | 428/189 |
| 5,159,717 | 11/1992 | Drew et al. | 2/20 |
| 5,175,197 | 12/1992 | Gestner et al. | 84/385 |
| 5,183,954 | 2/1993 | Wasser | 523/218 |
| 5,194,311 | 3/1993 | Baymak et al. | 428/116 |
| 5,204,154 | 4/1993 | Drew et al. | 428/76 |
| 5,362,543 | 11/1994 | Nickerson | 428/68 |
| 5,407,481 | 4/1995 | Drew et al. | 106/672 |
| 5,421,874 | 6/1995 | Pearce | 106/122 |
| 5,574,257 | 11/1996 | Brauer | 174/76 |

PRESSURE-COMPENSATING COMPOSITIONS AND PADS MADE THEREFROM

This application is a provisional of 60/006383 filed Nov. 8, 1995.

BACKGROUND OF THE INVENTION

The present invention generally relates to deformable, pressure-compensating padding devices such as seats, cushions, boot liners, mattresses etc., which are used in situations where the human body is in prolonged, abutting contact with a mechanical device. More specifically this invention relates to deformable, pressure-compensating compositions contained in such padding devices, wherein said compositions include a viscous fluid formed by a mixture of an oil and a block polymer.

A wide variety of viscous, deformable, pressure-compensating compositions (often referred to as "thixotropic compositions") have been developed for use in seats, cushions, mattresses, fitting pads, athletic equipment (e.g., ski boot liners), prosthetic devices and similar mechanical apparatus which are placed in prolonged contact with the human body. Such compositions provide both firm support and comfort because they have the capacity to deform in response to continuously applied pressure, but they also have the ability to maintain their shape and position in the absence of continuously applied pressure. Pads designed for use with such compositions allow the pressure-compensating compositions contained in them to deform in response to continuously applied pressure and thereby adapt to the contour of a particular part of the human body. Representative pressure-compensating compositions and/or padding devices are described in several patent references.

The Prior Art

U.S. Pat. No. 4,588,229 to Jay teaches a seat cushion which comprises a flexible envelope filled with a pressure-compensating, fluid material.

The Jay patent refers, inter alia, to U.S. Pat. Nos. 4,038,762; 4,144,658; 4,229,546; 4,243,754; and 4,255,202 to Swan which disclose a variety of viscous, flowable, pressure-compensating compositions which consist essentially of a major portion of petroleum-based oil (such as "Carnea" 21 or "Tufflo" 6204) and a minor amount of a petroleum-based wax (such as HM-1319) and a minor amount (by weight) of glass microballoons or lightweight, resinous microballoons or mixtures thereof.

U.S. Pat. No. 4,728,551 to Jay teaches a flowable pressure-compensating material, confined in a pad or envelope, which contains a flowable, continuous phase of oil which in turn contains a discontinuous phase comprised of discrete hollow microballoons and colloidal silica particles. The resulting pressure-compensating material flows in response to continuously applied pressure, but is essentially non-flowable in the absence of such pressure. The overall composition is relatively insensitive to temperature variations at those temperatures where these devices are normally employed (e.g., ambient and/or body temperature conditions).

It is of paramount importance that the deformable pressure-compensating compositions maintain their ability to deform in response to continuously applied pressure under all conditions of use. The prior art oil/wax compositions noted above perform reasonably well in many room and/or body temperature-defined situations. However, when these prior art compositions are subjected to temperatures higher than body temperatures or when subjected to body temperatures for long periods of time (i.e. six months or longer), the microballoons sometimes separate from the continuous phase materials or some of the fluid from the continuous phase separates from the continuous phase which results in the formation of non-deformable lumps in the composition. Separation is common in some prior art compositions after 6 months use, even without being subjected to temperature extremes. When such separation occurs, irrespective of the cause, the composition loses its ability to deform in response to continuously applied pressure and the non-deformable lumps which are formed by the separation can cause pressure build-up on the skin in the area of the lump and consequent skin damage. The separation may take place quickly particularly when the composition is exposed to elevated temperatures and, in many instances, the separation is irreversible. For example, unacceptable instances of phase separation of various oil/wax/microballoon compositions has been observed in cushions left in closed automobiles in strong sunlight. Under such conditions, temperatures above 120° F. and even temperatures of 170° F. are not uncommon and under such conditions serious, and often permanent, phase separation problems have taken place.

It is highly desirable that the deformable, pressure-compensating compositions maintain a stable, unchanging viscosity throughout the temperature range in which such compositions are used. Those skilled in the art also will appreciate that the viscosity of many oil/wax formulations can change drastically in those temperature ranges encountered during normal use. For example, in moving from about room temperatures (e.g., 75° F.) to skin temperature (95° F.), the apparent viscosity of some oil/wax systems may drop by as much as 50%. Consequently, as compositions of this type are warmed to near skin temperature conditions (e.g., this occurs after about two hours of constant sitting upon a wheelchair cushion), such compositions often develop a "watery" texture, i.e. the composition looses its ability to maintain its shape and position in the absence of continuously applied pressure. This is undesirable because a watery or readily deformable composition will no longer afford the same physical stability and support for the user of the pad. Stability and support are prime requirements in the wheelchair seating of disabled persons since such persons tend to easily lose their vertical stability when sitting on unstable seating surfaces.

The hydrocarbon oil/wax compositions of the prior art, largely owing to the presence of their hydrocarbon type oil component—possess poor flame retardancy qualities. Obviously, pressure-compensating compositions having better flame retardant qualities are to be preferred. Government regulations are becoming increasingly stringent with regard to flammability issues concerning home, public, and private care facility furnishings. With this high level of awareness given to flame safety, materials of construction that are inherently flame retardant will be favored over those materials that do not meet the applicable flame regulations.

The design of such deformable, pressure-compensating compositions must take several—often competing—factors into simultaneous consideration. These factors include: (1) weight: the composition should be light in weight because the less a product weighs, the easier it will be to handle and move; (2) viscosity stability with respect to temperature change: the deform and feel characteristics and position holding capabilities of such compositions should be temperature invariant as much as possible at those temperatures at which these devices are commonly used e.g., such compositions should not become "runny" at elevated ambient temperatures or "stiffen up" at relatively cold ambient temperatures; (3) viscosity stability with respect to extended use: the viscosity of the composition should not change over time as the composition is used; (4) phase separation resistance: compositions having multiple components should not separate into two or more phases with the passage of time; (5) low cost: lower costs are always of concern to both the manufacturer and the consumer; (6) skin irritation: The composition should not pose a significant skin sensitization or irritation potential; (7) micro-organism growth: The composition should have a low micro-organism food value potential in order to inhibit the growth of micro-organisms; (8) non-poisonous: The composition should have a high LD50 threshold (low risk of poisoning upon ingestion); (9) chemical compatibility with the envelope: The composition must not react with or permeate through the envelope in a manner which will result in leakage of the composition from the envelope, or cause a change in the physical properties of the envelope material or instability or phase separation of the composition; (10) flame resistance: such compositions are preferably non-hazardous. For example, they should be able to pass a recognized flame retardancy test e.g., tests such as those like, or substantially similar to, the so-called "Cal 133 test" (California Technical Bulletin 133 Flame Resistance Test) which is used to test the flame retardancy qualities of whole articles items, such as upholstered furniture and seating devices, or the "Cal 117 Test" which is used to test the resilient filling materials used within upholstered furniture; (11) ignition resistance: such compositions are preferably resistant to ignition as determined by a recognized test such as the so-called "Cal 117 test" (California Technical Bulletin 133 Flame Ignition Resistance Test).

U.S. Pat. 5,362,543 to Nickerson discloses a pressure compensating composition comprising a major portion of silicone fluid, a minor portion of amide thickener which is essentially insoluble in the silicone fluid, and microballoons. However, although it represents an advance over prior compositions, there is still a need for improvement, particularly regarding cost, flame retardancy, weight, and resistance to separation.

SUMMARY OF THE INVENTION

The present invention is directed to padding device comprising a flexible envelope and a deformable composition within said envelope wherein the composition comprises a thixotropic fluid formed from a mixture of an oil and a block polymer; wherein the block polymer has least one block which has a relatively low affinity for said oil and having at least one block which has a relatively high affinity for said oil. In the preferred embodiment the thixotropic fluid a micellular emulsion. The compositions are substantially incompressible and thixotropic, i.e., they deform when subject to continuous pressure, but tend to retain their shape in the absence of such pressure. The preferred micellular emulsion comprises a major portion of an oil and a minor portion of a diblock polymer. Microballoons are preferably added and uniformly dispersed throughout the micellular emulsion in order to reduce the density and adjust the viscosity of the composition, as well as reduce cost in some instances. A flame retardant, particularly an intumescent flame retardant, is also preferably added to the composition in applications where flame resistance is desired. Other additives may also be used, such as supplemental thickeners, biocides and antioxidants, to adjust viscosity, prevent micro-organism growth and prevent degradation.

A fundamental characteristic of the thixotropic fluids of the present invention is that they include a combination of compatible-incompatible components, preferably in the form of micellular emulsions, formed by the interaction of an oil and a block polymer. The present invention contemplates the use of diblock polymers, triblock polymers or higher polymers. A "diblock polymer" is a polymer having two different types of homopolymer blocks joined together to form a single polymer comprising the two different blocks. A "triblock polymer" is a polymer having two different types of homopolymer blocks with the end blocks being of the same homopolymer, but differing from the central homopolymer block.

The preferred diblock polymers are thermoplastics wherein one block of the polymer is a rigid plastic, such as polystyrene and the other block is a soft rubber-like elastomer, such as polybutadiene. Depending upon which diblock polymer is selected the elastomeric block may either be fully saturated, such as poly(ethylene-propylene), or unsaturated (containing double bonds at certain carbon to carbon sites along the chain), such as polybutadiene or polyisoprene. Such diblock polymers are sold commercially by Shell Chemical Co. under the name Kraton G1701 and Kraton G1702. They are also sold by Dexco Polymers under the name Vector 6030. Other potential sources include EniChem America Inc Europrene and Sol-T line of products and Nagase America Corporation Septon line of products.

A variety of oils may be used. The preferred oil is either a fully saturated polyalphaolefin (PAO), or a canola vegetable oil. The most preferred PAO is commercially available from Amoco Corporation as Durasyn 168, while the most preferred canola oil is a partially hydrogenated and fractionated canola vegetable commercially available from Alnor Oil Co.

In addition to the PAO oils, or vegetable oils, other oils such as polybutene oils, dialkyl carbonate oils, and paraffinic mineral oils have also been found to form micellular emulsion fluids with suitable diblock polymers that are suitable for pressure-compensating pads and the like.

Also, it has been found that in addition to canola oil, other vegetable oils such as olive, corn, safflower, rapeseed, sunflower, castor, soy, coconut, palm oils and mixtures thereof may be mixed with diblock polymers having one block polystyrene and the other block polybutadiene or polyisoprene to form fluid micellular emulsions that are suitable for pressure-compensating pads. One advantage of the vegetable oil formulations is the relatively low cost of the vegetable oil component. Another advantage is that adequate ignition resistance can be achieved with low levels of flame retardant or with no flame retardant.

The rigid polystyrene blocks of the diblock polymers have a poor affinity for the oil and the polystyrene blocks cluster together into groups, while the elastomer blocks have a relatively strong affinity for the compatible oil and are drawn outward from the clustered polystyrene blocks into the surrounding oil.

In order to form the thixotropic fluids of the present invention that include the combination of compatible-incompatible components and the preferred micelles, it is believed that, in general, the solubility parameter of the oil should be relatively close to the solubility parameter of one block of the block polymer, while the solubility parameter of the oil should be relatively different from the solubility parameter of the other block of the diblock polymer. In other words, one block of a diblock polymer will have an affinity for and tend to dissolve into the oil, while the other block will be insoluble in and tend to be repelled by the oil. It is theorized that this causes the diblock polymers to organize themselves into micelles with their insoluble blocks clumped together in the center and their soluble blocks extending outward into the surrounding oil (similar to the way that the hydrophobic and hydrophilic ends of soap molecules behave in water).

It is theorized that the interaction/intertangling of the many elastomer blocks extending out from the micelles causes the thickening effect which turns the oil into a thixotropic, grease-like composition. Moreover, the strong affinity of the oil for the elastomer blocks makes the composition highly resistant to separation, e.g., bleeding out of the oil from the composition. It is theorized that triblock polymers exhibit similar thickening mechanisms, but are less preferred because the extra block of the polymer can become associated with adjacent micelles, causing long range ordering and structure within the composition resulting in relatively high viscosities.

It is preferred to add microballoons to the thixotropic composition in order to reduce its density and adjust viscosity, as well as reducing the cost in some cases. The microballoons may be formed from phenolic or other plastic materials, glass or ceramic materials. Plastic microballoons are generally preferred because they are considerably lighter than glass or ceramic microballoons. Plastic microballoons offer additional benefits in that they can undergo instantaneous compression and recovery (rebound) for impact padding uses.

Moreover, it has been unexpectedly found that the preferred flame retardant additives, described below, are dramatically more effective when plastic microballoons are used as opposed to glass, ceramic, or phenolic microballoons. This great increase in flame resistance when plastic microballoons are used allows many materials to be rendered sufficiently flame resistant that simply could not be accomplished practically without the plastic microballoons or with glass, ceramic, or phenolic microballoons. This is all the more surprising since glass and ceramic microballoons are a non-flammable, non-fuel source material and so would normally be expected to impart more flame resistance.

The specifically preferred variety of plastic microballoons have a PAN/PMMA (polyacrylonitrile and polymethylmethacrylate) shell surrounding an isobutane gas blowing agent, sold by Nobel Industries under the commercial name Expancel 091 DE microballoons.

There are a number of known flame retardants which can be added to the deformable compositions of the present invention. The preferred type is an intumescent flame retardant (IFR), which forms a fluffy, carbonaceous foam char as an ashy by-product when the composition is burned. The system consists of three chemical parts: a catalyst, a carbon source, and a blowing agent. In the preferred embodiment, the catalyst is a phosphoric acid that has been neutralized to an ammonium salt form and polymerized into a long chain to reduce moisture effects and undesirable chemical reactions with other composition formulation components; (ammonium polyphosphate or APP); the carbon source is pentaerythritol (a polyol or polyhydric alcohol); and the blowing agent, which does not take part in the reaction, but degrades with heat, giving off ammonia, nitrogen, carbon dioxide, and/or water, is a melamine formaldehyde coating encapsulating the APP particles (which helps prevent potential skin irritation problems). The blowing agent can also be added separately. Other blowing agents include melamine, melamine phosphate, melamine cyanurate, azodicarbonamide, dicyandiamide, diguanamide, and others.

Although IFRs are preferred, other flame retardants may also be used. They generally work in one of four ways: (1) they interfere with flame chemistry in the solid phase, (2) they interfere with flame chemistry in the gas phase, (3) they absorb heat, or (4) they displace oxygen. Examples of these other types of flame retardants include halogenated aromatic or aliphatic compounds; hydrated metal oxides, other metal oxides (e.g., zinc, molybdenum, iron, antimony, boron, and combinations), char forming and glass forming compounds, e.g. borates and silicones, and gas formers (melamines, formaldehydes, ammonium compounds, higher amides, and carbonates).

"Synergists" may also be added to improve the performance of any one or combination of these retardants. Synergists include antimony oxide, zinc, boron, bismuth, tin, iron, and molybdenum metals and compounds. Some of these materials are used singly in certain flame retardant formulations. Most often they are used in conjunction with other flame retardants, especially the halogenated varieties.

It will be understood that each type of flame retardant will require a minimum loading to pass a particular flame resistance standard.

The deformable pressure-compensating compositions of the present invention are especially useful as filling materials for deformable, pressure-compensating padding devices comprising a flexible protective envelope having a cavity which contains the composition and which envelope has structure which allows the composition to deform in the cavity in response to a continuously applied load upon said envelope, but to maintain position in the absence of pressure. The deformable compositions of the present invention are particularly characterized by their: (1) ability to deform by flowing in response to continuously applied pressure, (2) tendency to maintain their shape and position in the absence of a continuously applied pressure, (3) lack of resiliency, under pressure loadings normally associated with seating or mattress applications (4) small changes in viscosity when subjected to changes in temperature, (5) resistance to phase separation of their thickener and/or microballoon components, (6) exceptional flame retardancy qualities, (7) chemical compatibility with polyurethane films, (8) excellent skin contact characteristics (i.e., very low probability of skin irritation), (9) essentially non-poisonous, (10) low microorganism growth potential, and (11) viscosity stability over time.

It should also be noted that the novel compositions of the present invention may also be used for a very broad range of other applications, such as prosthetic and other medical devices, wheel chair or other seating, mattresses, helmet padding, bicycle seats, knee pads, athletic equipment pads, handles, seating—virtually any place where foam is now used.

DESCRIPTION OF PREFERRED EMBODIMENTS

Ranges of Relative Proportions of Ingredients

The two basic components of the thixotropic fluids of the present invention are an oil and a compatible/incompatible block polymer. The combination of the oil and the block polymer forms a viscous, grease-like thixotropic fluid. This viscous, thixotropic fluid serves to suspend the non-liquid components of the composition and prevent them from settling and separating. The viscous, thixotropic fluid largely determines the final viscosity profile of the composition, although the addition of the non-liquid components does modify the viscosity profile of the composition. Optional additives include supplemental thickeners, microballoons, flame retardants, biocides and antioxidants. However, if the viscous, thixotropic fluid and the non-liquid components are blended together within a narrow, but controllable range of weight ratios a composition having an acceptable viscosity profile is produced.

Table 1 below gives some approximate useable and preferred ranges by weight for the components of the compositions of the present invention.

TABLE 1

GENERAL FORMULATIONS

| Ingredient | Usable Range | Preferred Range |
|---|---|---|
| Oil | 20 to 95 | 55 to 80 |
| Diblock Polymer | 2 to 22 | 3 to 15 |
| Supplemental Thickener | 0 to 20 | 3 to 10 |
| Microballoons: | | |
| Plastic | 0 to 15 | 2 to 15 |
| Glass | 0 to 50 | 5 to 40 |
| Flame Retardant | 0 to 40 | 6.5 to 32 |
| Biocide | 0 to 2.0 | 0.2 to 1.0 |
| Antioxidant | 0 to 3.0 | 0 to 0.3 |

These grease-like compositions generally have a useful viscosity range of about 100,000–1,000,000 centipoise (cps). However, for pressure relieving applications the preferred useful viscosity range is generally between about 100,000–280,000 cps, with the most preferred viscosity of the final formulation being between about 180,000–200,000 cps when me The Oil The preferred oil used to prepare the grease-like, thixotropic fluids of the present invention is either a polyalphaolefin (PAO) oil, or a canola oil. The most preferred PAO oil is sold commercially by Amoco Corp. as Durasyn 168, which is a hydrogenated homopolymer of 1-decene with a molecular weight of about 1120. The most preferred canola oil is a partially hydrogenated, fractionated canola oil available from Alnor Oil. Other oils found to be suitable with diblock polymer to form the thixotropic fluids of the present invention include other vegetable oils, polybutene oils, dialkyl carbonate oils, and paraffinic mineral oils.

PAO Oils

PAO oils are synthetic, saturated aliphatic oils, which are polymerized from a variety of feedstocks. The "Durasyn" brand of PAO oils are produced from a 1-decene (10 carbon chain) feedstock from Amoco Corporation. The Durasyn PAO oils are Unavailable in a wide variety of molecular weights depending upon the number of 1-Decene units that are incorporated into the final molecule. The solubility parameter is generally independent of molecular weight in PAO oils, although PAO oils having different molecular weights do display differing physical and chemical properties. For the purposes of creating a deformable composition within the present invention, the properties of interest included viscosity, viscosity index, density, closed cup flash point, and solubility parameter match with the elastomer block of the selected diblock thickener.

Matching the solubility parameter between the PAO oil and the diblock thickener is a first step in picking the best combination of materials to prepare the compositions of the present invention, but other factors, sometimes unknown, also appear to influence the properties of the composition. As a general rule, lower molecular weight materials do not need to have solubility indexes as close as is required for higher molecular weight materials. For example, it was found that above a certain molecular weight of PAO oil, the thickener was no longer effective.

The lower molecular weight PAO oils also exhibit a lower flash point temperature as measured by the ASTM D 92 closed cup method. For the purposes of maximizing the flammability resistance of this formulation, it is desirable to reduce the ease with which flammable compounds are volatilized from the solid or liquid state into a vapor state. For this reason it is desirable to have as high a molecular weight as possible to maximize difficulty in volatilizing the oil. This is reflected by the higher flash points for higher molecular weight PAO oils.

Viscosity index is a measure of how quickly a material decreases viscosity with heat and increases viscosity with cold. The higher numbers indicates more stable materials and is more desirable. Within each family of oils, the viscosity index is generally independent of molecular weight. It was found that the Durasyn 168 exhibited the best combination of properties for use in the compositions of the present invention. These values are listed in Table 2 for the various Amoco "Durasyn" PAO oils.

TABLE 2

| Product ID | Molecular Wt. | Viscosity, cSt, 40° C. | Flash Point, °C. |
|---|---|---|---|
| Durasyn 162 | 287 | 5.54 | >155 |
| Durasyn 164 | 437 | 16.8 | 215 |
| Durasyn 166 | 529 | 31.0 | 235 |
| Durasyn 168 | 596 | 46.9 | 253 |
| Durasyn 170 | 632 | 62.9 | 264 |
| Durasyn 174 | 1400 | 395.0 | 272 |
| Durasyn 180 | 2000 | 1250.0 | 288 |

Vegetable Oils

Vegetable oils have also been found to form suitable thixotropic fluids and deformable compositions for use in pressure-compensating pads according to the present invention. Vegetable oils have the advantage of being lower cost than the PAO oils. Compositions formulated from vegetable oil based fluids are ignition resistant and will pass testing similar to the Cal 117 ignition test (the composition will not burn after exposure to a Bunsen burner flame for 12 seconds). The diblock polymer preferred for use with vegetable oils has one polystyrene block and one polybutadiene block. The polybutadiene block has unsaturated carbon bonds that apparently result in a solubility parameter which is similar to that of various vegetable oils, which also have unsaturated carbon bonds. To produce micellular emulsions using vegetable oil generally requires heat and substantial agitation. Because vegetable oils are typically unsaturated, it may be desirable to add antioxidants. The lower cost and better resistance to ignition of the vegetable oil based compositions make them potentially desirable. Examples of suitable vegetable oils include olive, corn, safflower, rapeseed, sunflower, castor, soy, coconut, palm, and others of the triglyceride family. The vegetable oils may be hydrogenated and/or hydrogenated and fractionated in order to provide a lower degree of unsaturation and consequently require lower level of antioxidants or no antioxidants. Canola oil, hydrogenated canola oil and hydrogenated/ fractionated canola oil have shown particular promise. Some animal oils or fats may also be used.

Other Oils

Other oil families form an acceptable thixotropic fluids with the block polymers, but the thixotropic fluids formed by these oils are less preferred on the basis of other properties such as cost, flammability, compatibility with current flexible envelope material, availability, microbial susceptibility, and oxidation resistance.

Examples of the properties for available Amoco "Indopol" polybutene oils are reported in Table 3:

TABLE 3

| Product ID | Molecular Wt. | Viscosity, cSt, 40° C. | Flash Point, °C. |
|---|---|---|---|
| Indopol L-14E | 320 | 139 | 138 |
| Indopol L-50 | 420 | 504 | 138 |

These low molecular weight polybutene oils create a very thick, very viscous, highly thixotropic composition. Compositions produced with polybutene oils have a slightly higher viscosity than similar compositions produced with PAO oils of comparable molecular weight, possibly due to the larger molecules interfering with the interaction of the diblock details with each other. For example, 11% of Kraton G1702 in Indopol L-14E (low molecular weight polybutene oil) results in a composition with approximately the same viscosity characteristics as a composition of 13% Kraton G1702 in Durasyn 168 (PAO). Nevertheless, even though requiring more diblock polymer, the higher molecular weight PAOs are preferable because they are less volatile and thereby increase the flash point of the system.

Examples of the properties available for Agip Petroli "MixOil" dialkyl carbonate oils are described in Table 4:

TABLE 4

| Product ID | Molecular Wt. | Viscosity, cSt, 40° C. | Flash Point, °C. |
|---|---|---|---|
| MixOil MX2201 | 497 | 17.8 | 214 |
| MixOil MX2204 | 174 | <17.8 | N.A. |

Examples of the properties for available Shell "Carnea" paraffinic mineral oils are described in Table 5.

TABLE 5

| Product ID | Viscosity, cSt, 40° C. | Flash Point, °C. |
|---|---|---|
| ISO Grade 10 | 10 | 154 |
| ISO Grade 15 | 15 | 163 |
| ISO Grade 22 | 22 | 168 |
| ISO Grade 32 | 32 | 182 |
| ISO Grade 46 | 46 | 190 |
| ISO Grade 68 | 68 | 204 |
| ISO Grade 100 | 100 | 216 |

A comparison of the viscosity index of each family of oil is listed in Table 6.

TABLE 6

| Oil Family | Viscosity Index |
|---|---|
| PAO | 138 |
| Polybutene | 90 |
| Dialkyl Carbonate | 120 |
| Mineral | 90 |

The PAO family of oils demonstrated the best combination of properties of those shown in Table 6. This oil family exhibited the highest flash point and viscosity index of the group of four selected for evaluation. Published viscosity index data was not available for the vegetable oils. Viscosity variability with temperature was determined by testing vegetable oil based fluids and compositions and found to be superior to most prior art compositions. The polybutene oils from Amoco Corporation, mineral oils from Shell Corporation, and the dialkyl carbonate oils from Agip Petroli Corporation of Italy all formed compositions with excellent properties when matched with the selected diblock polymers.

The Block Polymer

A number of different block polymers may be used as the compatible/incompatible component of the thixotropic fluids of the present invention. The preferred diblock polymer for use with the PAO oils are thermoplastics where one block of the polymer is rigid polystyrene and the other block is soft rubber-like elastomer sold commercially by Shell Chemical Co. under the name Kraton G1701 and Kraton G1702. The preferred diblock polymers for use with the vegetable oils are sold commercially by Dexco Corp. under the name Vector 6030 and from Firestone under the name Stereon 7030A.

Both Kraton G1701 and G1702 consist of a single polystyrene block on one end of the molecule and of a poly (ethylene-propylene) block on the other end and have a molecular weight of approximately 100,000. The Kraton G1702 polymer has a polystyrene content of 28% compared to 37% for the Kraton G1701 polymer. The Kraton G1702 is slightly preferred because it produces a composition having slightly lower flammability than a similar composition made with Kraton G1701. It is believed that this lower polystyrene content of Kraton G1702 polymer produces a composition having a lower flammability. The rigid polystyrene blocks of the diblock polymers have a poor affinity for and are insoluble in the selected oil (e.g., PAO, polybutene, dialkyl carbonate or mineral), while the soft (rubber-like) elastomeric poly(ethylene-propylene) blocks have an affinity for and are soluble in the oil (i.e., have a close solubility parameter).

Diblock polymers having one polystyrene block and the one polybutadiene block are particularly useful with vegetable oils. Such polymers are available from Dexco and sold under the commercial name Vector 6000, 6001 and 6030, with molecular weights of 150,000, 250,000 and 145,000, respectively. A tapered diblock polymer of polystyrene and polybutadiene sold under the tradename Stereon 730A from Firestone is also useful.

It is postulated that the differential in the solubility parameter compatibility of the two blocks and the oil results in micelles being formed, with the rigid polystyrene blocks clustering together into groups and the elastomeric blocks being drawn outward and essentially dissolving into the surrounding oil. The unique micellular structure of the compositions that provides the desirable thixotropic properties. The interaction/intertangling of the many elastomeric extending out from the polystyrene clusters of the micelles into the oil causes the thickening effect which turns the oil into a deformable, thixotropic fluid. Moreover, the strong affinity of the oil for the elastomeric blocks makes the composition highly resistant to separation, e.g., bleeding out of the oil from the composition.

The present invention also contemplates that use of certain triblock polymers that form micelles when mixed with a compatible oil. Commercially available triblock polymers have typical block arrangement that consists of a central soft rubber-like elastomeric block flanked by two rigid polystyrene blocks. The Kraton triblock polymers can be classified into three basic types of polymers: S-B-S, S-I-S, or S-EB-S. A triblock consists of three differing blocks, or segments of identical repeating sub-units. The "S" designator stands for polystyrene, "B" stands for polybutadiene; "I" stands for polyisoprene; and "EB" stands for poly(ethylene-butylene) or in some cases poly(ethylene-propylene). Polymer micelles formed from such triblock polymers have the ability to associate with adjacent micelles through the polystyrene end blocks. One polystyrene end block may be embedded in the central clump of one micelle while the other polystyrene end block may be embedded in the central clump of an adjacent micelle. The triblock based compositions tend to have a solid, rubber or gelatin-like consistency, rather than a thin grease-like consistency.

The present invention further contemplates other thixotropic fluid formed by the interaction of a major portion of a silicone oil mixed with a diblock polymer having a soft silicone polymer grafted onto a hard polystyrene block to form a micellular emulsion. The present invention also contemplates diblock polymers formed by grafting a rigid polycarbonate onto polyisoprene, polybutadiene, or poly (ethylene-propylene). A diblock polymer having a soft polyester block would form a micellular emulsion with an ester oil, and a diblock polymer having a soft polyglycol ester block would form a micellular emulsion with such a glycol ester.

Selection of the compatible-incompatible components

Preferable formulations require matching the selected block polymer elastomeric block with specific families of oils. Saturated elastomeric blocks (those polymers containing no double bonds between adjacent carbon atoms), such as the ethylene-butylene, or ethylene-propylene performed best with saturated oils. Unsaturated elastomeric blocks (those polymers that do contain double bonds between adjacent carbon atoms), such as the butadiene and isoprene block polymers, performed best with unsaturated oils such as the vegetable oils.

One important attribute generally determining whether an oil will form a micellular emulsion is whether the solubility parameter of the oil is similar to the solubility parameter of one block of the diblock polymer and dissimilar to the other block. Solubility parameters can be calculated by, e.g., Small's or Hildebrand's methods, or using boiling points and/or surface tension, or other known methods, and are published in widely available tables. Due to the differential solubility parameters, one block of the diblock polymer will have an affinity for and tend to dissolve in the oil, while the other block will be dissimilar to and tend to be repelled by the oil. Hence, the dissimilar blocks of the diblock polymers try to congregate together while the blocks of the diblock polymers with solubility parameters similar to the oil solubility parameter will be attracted the surrounding oil. This causes the diblock polymers to organize themselves into micelles with their insoluble ends clumped together in the center and their soluble ends extending outward into the surrounding oil (similar to the way that the hydrophobic and hydrophilic ends of soap molecules behave in water).

With regard to PAO oil, the solubility parameter is about 7.71–8.5 (depending on how calculated), while the solubility parameters of polystyrene and poly(ethylene-propylene) are 9.1 and 8.91, respectively. Thus, in this case, although the solubility parameters of the two blocks of the diblock polymer are fairly close, the polystyrene block is nonetheless quite dissimilar to both the poly(ethylene-propylene) block and the PAO oil (which are similar to each other), so the polystyrene blocks tend to cluster together and micelles form. Similarly, the solubility parameter of a vegetable oil (a typical configuration being a triglyceride with stearic pendant groups) is 8.85 and the complementary elastomer of polybutadiene has a solubility parameter of 8.1–8.6. The solubility of other oils such as polybutene have been calculated to be 7.42–8.02 and to be 8.38 for dialkyl carbonate oils.

However, the solubility parameter is not necessarily the sole factor for determining whether a particular oil and diblock polymer will form micelles. Other characteristics of the oil and the block polymers may also be important. For example, the molecular weight of the oil also impacts on the formation and characteristics of the micellular emulsions. Generally, the higher the molecular weight of the oil, the closer the solubility parameter of the oil should match the solubility parameter of the soluble block the of the diblock polymer. The higher molecular weight of the oil tends to produce micellular emulsion grease having slightly lower viscosity. On the other hand, higher molecular weight oils are desirable because they are less volatile, have higher flash points and are less flammable. Hence, although the differential solubility parameter compatibility between one block of the diblock and the other block is a primary consideration for identifying suitable oils and diblock polymers, other factors may also need to be considered.

Normally, it is desirable to select an oil that is compatible with the elastomeric block of the diblock polymers, but not the styrene block. By being compatible, the elastomeric block of the polymer will preferentially dissolve into the oil. This is thermodynamically favorable. However, it is thermodynamically unfavorable for the styrene end to accompany the elastomeric end into solution and remain in a separated, free floating configuration. The thermodynamic energy of the system can be brought into a more favorable configuration if the styrene ends of the molecules can somehow rearrange themselves so that they minimize the collective surface area in contact with the oil while maximizing the exposed collective surface area of the elastomeric ends This is easily accomplished if the molecules align themselves with the styrene ends clumping together in the center of a ball with the elastomeric tails pointing out into the oil. This can be best visualized by comparing the structure to that of a sea urchin. The diblock micelles formed are extremely small. Although the aggregate diameter is not known quantitatively, the thixotropic fluids formed by these oil/polymer systems were of a light blue shade, indicating that the micelles were probably absorbing and interfering with the blue components of visible light. The thixotropic character of the fluids are believed to be caused by the small particle interaction of these micelles. The long chains of the elastomers of one micelle interact with and entangle with elastomer chains of other micelles.

Supplemental Thickener

The present invention contemplates the use of supplemental particle-type thickeners to increase the viscosity of the deformable compositions and/or to modify the viscosity/shear curve of the composition to provide a more desirable viscosity profile. The supplemental thickeners are substantially insoluble in the oil/block polymer composition so that the supplemental thickener is dispersed throughout the oil/block polymer composition as small, discrete solid particles, e.g. particle sizes in the 1 to 10 micron range. Various materials may be used as supplemental thickeners including clays, silicas and insoluble organic materials such as fatty acid amides and some types of polyethylene wax, castor wax, natural and petroleum derivitized waxes. Paracin P285, reported to be N,N'-ethylene bis(12-hydroxy steramide), and AC405, reported to be and ethylene/vinyl acetate wax are preferred. Other waxes which may be used are shown in Table 7, below.

TABLE 7

| Wax Name | Chemical Designation | Manufacturer |
| --- | --- | --- |
| Epolene N-15P | polypropylene | Eastman Chemical Co. |
| AC680 | Oxidized polyethylene homopolymer | Allied Signal |
| AC307-A | Oxidized polyethylene homopolymer | Allied Signal |
| AC540 | Ethylene Acrylic Acid copolymer | Allied Signal |
| AAC405-T | Ethylene vinyl acetate copolymer | Allied Signal |
| AC9 | polyethylene homopolymer | Allied Signal |
| AC617 | polyethylene homopolymer | Allied Signal |
| EBS Crodamide | Amide | Croda Universal, Inc. |
| EBO Crodamide | Amide | Croda Universal, Inc. |
| Kantstik S | Amide | Specialty Products |
| Paracin P220 | Amide | CasChem |
| Paracin P285 | Amide | ChasChem |
| Thixcin R | Castor wax | Rheox Corp. |
| Baragel 10 | Bentonite Clay | Rheox Corp. |
| Cab-O-Sil | fumed silica | Cabot Corp. |

The use of wax thickeners in the compositions of the present invention provides an enhanced flame suppression characteristic which is not found when inert or solid thickeners, such as clays or silicas, are used in such compositions. The waxes change in physical state during flame ignition from a solid to a liquid to a gaseous state. This physical change is an important element in the ability of the composition to suppress ignition. These changes in physical state either absorb heat or changes the flame characteristics rendering the composition ignition resistant.

Compositions containing vegetable oil based thixotropic fluids, wax-type supplemental thickeners and plastic microballoons are flame ignition resistant and will pass test similar to the Cal 117 test. Although the chemical components of such compositions are individually flammable, when these components are combined into the preferred composition, the composition becomes flame resistant.

It has been found that the addition of the supplemental thickener can bolster the viscosity curves for the deformable compositions of the present invention. Compositions prepared with supplemental thickeners have improved resistance to slump, particularly after mechanical working of the composition. The vegetable oil based compositions containing supplemental thickeners also show improved viscosity stability with respect to temperature change.

The Microballoons

The microballoons preferably used in the formulations are discrete micro-sized particles. The microballoons constitute a discontinuous, solid phase uniformly dispersed in the thixotropic fluid which comprises the deformable component of the composition. Mixtures of different microballoon species also may be used in the practice of the invention. The size of the microballoons will preferably be within the size range of about 10 to about 300 microns. It is generally preferred to use from about 2 to about 4 percent by weight of light plastic microballoons, or about 5 to about 40 percent by weight in the case of glass microballoons.

The density of the microballoons generally will be between about 0.025 and about 0.80 g/cc. Microballoons serve as density-reducing components of the compositions. Therefore, the weight of the microballoons in most cases will be lower than the combined weight of all of the other components. Although plastic microballoons are preferred, glass, phenolic, carbon, ceramic or other microballoons may be used in the compositions of the present invention. The volume of microballoons in the deformable pressure-compensating compositions affects the overall viscosity of these compositions. The maximum theoretical loading for spherical microballoons of the same size, with nearly perfect packing of the microballoons, is about 74% by volume. However, the maximum loading of the microballoons in the herein described compositions is less than this theoretical maximum, and preferably a microballoon loading is from about 40 to about 60 volume percent. For the lightest formulations, depending on microballoon density, it is preferred to load to this volumetric percentage. Weight percentages will depend on the relative densities of the microballoons and the thixotropic fluid.

Plastic (i.e. copolymer or acrylic) microballoons have densities in the 0.025–0.15 g/cc range. Glass microballoons generally have densities in the 0.15–0.8 g/cc range. Phenolic microballoons have densities in the 0.15–0.25 g/cc range. Obviously, such differences can have rather significant effects on the overall densities of the final deformable compositions, which may range from about 0.30 to 0.95 g/cc. With such differences in the densities of the microballoons, the microballoon weight proportion of the overall composition can vary considerably.

Plastic microballoons are generally preferred because they are considerably lighter than glass or ceramic. The specifically preferred microballoons are pre-expanded and have a PAN/PMMA (polyacrylonitrile and polymethylmethacrylate) shell surrounding a butane gas blowing agent. They are sold by Nobel Industries under the commercial name Expancel 091 DE microballoons. The plastic shell has a solubility parameter that is significantly different from the oil and both blocks of the diblock polymer, so there is little or no risk of dissolving the shell. The density of the preferred Expancel 091 DE microballoons is 0.03 g/cc, and they have an average diameter of 40 to 60 microns when expanded. The Expancel 461 DE and 551 DE are similar to the 091 DE microballoons and are also suitable for the composition, although less preferred.

Glass microballoons can also be used, but with a substantial increase in weight and a dramatic reduction in the effectiveness of the preferred intumescent flame retardant. When glass microballoons are used the preferred percentage by weight of the total formulation is about 5 to 40% based upon a microballoon density of 0.20–0.40 g/cc, and the preferred percentage by volume is about 40–60%. Other glass microballoon densities are available, but are generally either too light and weak or too heavy to be of use.

The Flame Retardant

The preferred type of flame retardant is an intumescent flame retardant (IFR), which forms a fluffy, carbonaceous foam char as an ashy by-product when the composition is burned. The system consists of three chemical parts: a catalyst, a carbon source and a blowing agent. In the preferred embodiment, the catalyst is a phosphoric acid that has been neutralized to a salt form and polymerized into a long chain to reduce moisture effects and undesirable chemical reactions (ammonium polyphosphate or APP); the carbon source is pentaerythritol (a polyol or polyhydric alcohol); and the blowing agent, which does not take part in the charring reaction, but degrades with heat giving off ammonia, nitrogen, carbon dioxide, and/or water, is melamine formaldehyde, which is preferably an encapsulating shell surrounding the APP in order to avoid skin irritation problems.

With the PAO based compositions, the preferred amount of the total IFR components is generally about 23% by weight of the formulation comprising the PAO oil, Kraton G1702 diblock polymer, and plastic microballoons. For the vegetable oils based compositions, sufficient flame retardant is used to achieve the desired level of flame resistance. Generally, for applications requiring a composition to have only resistance to ignition sources similar to the ignition source of the Cal 117 test, no flame retardant is required in the preferred vegetable oil based formulations. For applications requiring a composition with the ability to self-extinguish from flame sources similar to those used in the Cal 133 test, approximately 23% IFR is required in the preferred vegetable oil based formulations.

Specific examples of various IFR components are listed in Table 8. This table lists the product name, the generic composition and the function that the component serves. There are many variations available from many different sources.

TABLE 8

| | | | FUNCTION | | |
|---|---|---|---|---|---|
| Product ID | Vendor | Chemical Composition | Cat | Char | Blow |
| Hostaflam 422 | HC (1) | APP | X | | |
| Hostaflam 462 | HC | APP | X | | X |
| Hostaflam 750 | HC | APP | X | | |
| Amgard ND | A&W (2) | Di-melamine Phosphate | X | | X |
| Amgard NH | A&W | Melamine Phosphate | X | | X |
| Amgard NP | A&W | EDAP + Melamine | X | | X |
| Amgard NK | A&W | EDAP (3) | X | | |
| Amgard MC | A&W | APP | X | | |
| Amgard MJ | A&W | Melamine Pyrophosphate | X | | X |
| | DSM (4) | Melamine di-borate | | | X |
| Spinflam MF | Himont | Proprietary | X | X | X |
| THEIC | BAASF | Tris-hydroxy isocyanurate | | X | |
| Pentaerythritol | Various | polyol | | X | |
| Manitol | Various | aliphatic polyol | | X | |
| Sorbitol | Various | aliphatic polyol | | X | |
| NH 1197 | Great Lakes | Proprietary | X | X | X |
| NH 1151 | Great Lakes | Proprietary | X | X | X |
| MAP | Monsanto | Mono ammonium phosphate | X | | |

(1) Hoechst Celanese Corporation
(2) Albright & Wilson Corporation
(3) Ethylene diamine ammonium phosphate
(4) DSM Americas Corporation Although IFRs are preferred, other flame retardants may also be used. They generally work in one of four ways: (1) they interfere with flame chemistry in the solid phase, (2) they interfere with flame chemistry in the gas phase, (3) they absorb heat, or (4) they displace oxygen. Examples of these other types of flame retardants are listed in Table 9.

TABLE 9

| | | | Function | | | |
|---|---|---|---|---|---|---|
| Product ID | Vendor | Chemical Composition | Solid | Gas | Coolant | Inert Gas |
| Melamine | DSM | Melamine | | X | | X |
| Melamine Di-borate | DSM | Melamine di-borate | X | X | | X |
| AOM | Climax Corp | Ammmonium octamolybdate | X | | X | X |
| Flamebrake ZB | US Borax | Zinc borate | X | | X | |
| Borax | US Borax | Hydrated borax | X | | X | |
| Saytex 102 | Albemarle | Brominated aromatic | | X | | |
| HBCD | Albemarle | Brominated aliphatic | | X | | |
| Mg Hydroxide | Dead Sea Bromine | Mg hydroxide | | | X | |
| PyroChek 68PB | Ferro | Brominated polystyrene | | X | | |
| Kemgard 911C | Sherwin Wm | Zinc molybdate | X | | | |
| Epsom Salt | PQ Corp | Magnesium sulfate | X | | X | |
| Bismuth Sub-Carbonate | Metal Specs | Bismuth sub-carbonate | X | | | X |
| Haltex 3xx | Hitox Corp | Alumina trihydrate | | | X | |
| SFR 100 | GE Silicones | High viscosity silicone oil | X | | | |
| BurnEx 2000 | Nyacol Corp. | Antimony pentoxide | | X | | |

As noted above, the IFRs unexpectedly function much more effectively when plastic microballoons are used instead of glass. Glass microballoons generally require about 33% minimum IFR material. This is theorized to be due to the glass microballoons wicking by capillary action the flammable liquid of the composition out to the flame front. Also, unlike plastic, glass microballoons do not melt and remain in the ash structure, thereby perhaps preventing the IFR from expanding and insulating the fuel from the oxygen and flame.

Likewise, flame retardants based on halogenated technology work by generating gases that interfere with the flame chemistry as well as displacing oxygen. Hence, they need to burn at the flame front in order to work, and glass microballoons seem to sequester these agents too far from the flame front to be effective, while at the same time it is postulated that the glass microballoons wick the flammable liquids out to the flame front. This phenomenon may be some what overcome by the use of low melting point aliphatic halogenated compounds. A particularly effective example of this class of chemical is Saytex HBCD-LM, available from Albemarle Corp. It has been shown to melt and wick to the flame front, along with the fuel, at which point it decomposes releasing its bromine component.

Other Additives

A small amount of a biocide preservative, such as a paraben oil mixture, sold by ICI Sutton Labs under the name Liquipar, is preferably added to POA based compositions in order to inhibit microorganism growth. Biocide combinations which have proven successful for compositions containing vegetable oil based thixotropic fluids include methylparaben, Liquapar (which contains isopropylparaben, butyl paraben and isobutyl paraben), EDTA (ethylene ethylenedinitrilo-tetraacetic disodium salt), benzalkonium chloride and phenoxyethanol.

Testing has shown that for POA based compositions, antioxidants, other than those already present in the Kraton G1702 product, are not required. For vegetable oil based compositions, it may be desired to add antioxidants, such as vitamin E, hindered phenols, secondary amines, phosphates, phosphites, and oxidized sulfur systems. Generally it is preferred to use antioxidants which have been approved for use in foods such as BHA (butylated hydroxyanisole), BHT (butylated hydroxytoluene), TBHQ (tertiary butyl hydroxyquinone), tocopherols, ascorbic acid and its esters, propyl gallate, calcium lactate, ethoxyquin and the like. The addition of minor quantities of silicone oil to vegetable oil based compositions have increased the oxidation resistance of the compositions.

Other possible additives that may be used with all oil family oils include perfumes, dyes, extenders, fillers, tackifiers, UV stabilizers, and surfactants.

The Mixing Process

The deformable pressure-compensating compositions of the present invention are preferably prepared as follows. A desired quantity of oil is measured out. Then, an appropriate quantity of diblock polymer is crumbled into the oil, ensuring adequate vigorous agitation with a Cowles blade type disperser to avoid agglomeration of the polymer.

The mixture is agitated until the oil/polymer slurry begins to thicken (approximately 30 minutes). It is then left for at least 12 hours so that the polymer can completely take up the oil. All of the other ingredients, if any, are then added, except the microballoons, and the composition is mixed thoroughly to assure complete dispersion of any powders.

Finally, the microballoons are added and thoroughly mixed with a low shear ribbon blender type mixer.

In the case of PAO oil based compositions, all of the above steps may be performed at room temperature. However, for vegetable oil based compositions, heat (approx. 160° F.) and substantially more agitation are preferred.

The compositions based on vegetable oils and block polymers wherein a supplemental thickener (such as Paracin P-285) is used are best prepared by heating the components under conditions that melt the supplemental thickener and form a liquid mixture. The heated mixture is then passed through a colloid mill running at 20 to 25 k rpm with a gap setting of 1 to 10 mils in which it is mixed to assure dispersion of the oil, diblock polymer, wax and antioxidant. The composition leaves the colloid mill at 270° to 310° F. and is quickly cooled by passing through a chilled three roll mill. The chilling step causes the supplemental thickener to form very small solid particles in the order of 1 to 10 microns which are uniformly disperse throughout the viscous liquid oil/block polymer.

The Envelope

The envelope in which the deformable, pressure-compensating composition is confined may be fabricated from any flexible sheet-like material which is inert with respect to the deformable pressure-compensating composition and/or any component thereof. The materials from which the envelopes are made should also provide a complete barrier for all components of the composition. The envelopes may be formed of a variety of flexible and pliable materials known to the art, e.g., synthetic resinous materials, such as polyurethanes. Polyurethane films are useful in the practice of this invention because they possess superior softness, suppleness, and strength compared to, for example, PVC films. Polyurethanes do not contain plasticizers which may leach out over time to cause the film to harden, crack, or otherwise change in an undesirable manner. Preferably the material used to construct the envelope will be heat or radio frequency sealable to provide a substantially impervious seal which prevent leakage of any and all materials. The resinous film material also should be very flexible and/or elastomeric, both at ambient room temperatures and at the temperatures at which such pressure-compensating pads are used e.g., in the vicinity of 100° F. It also is important that the envelope material be durable and retain its flexible, pliable properties over extended periods of use.

THE EXAMPLES

The following examples will serve to illustrate some deformable pressure-compensating compositions within the scope of the present invention. It is understood that these examples are set forth merely for illustrative purposes and many other compositions are within the scope of the present invention. Those skilled in the art will recognize that compositions containing other quantities of material and different species of the required materials may be prepared.

Example 1

The preferred composition containing the preferred PAO-based thixotropic fluid according to the present invention is given, along with preferred useful ranges, as follows:

| Ingredient | Wt Percentage | Range |
| --- | --- | --- |
| Durasyn 168 (PAO Oil) | 69.64 | 20 to 91 |
| Kraton G1702 Diblock Polymer | 4.85 | 2 to 15 |
| 091 DE plastic microballoons | 3.00* | 2 to 15 |
| Hostaflam 462 encapsulated Ammonium Polyphosphate | 14.08 | 5 to 30 |
| Pentaerythritol | 8.23 | 2 to 15 |
| Liquipar (paraben biocide oil) | 0.20 | 0.1 to 0.5 |

*Approximately 55% by volume.

The overall density of the composition of Example 1 is about 0.52–0.54 g/cc, and the viscosity is about 180,000 to 200,000 cps, measured using a Brookfield viscometer, spindle #7, at 20 RPMs.

Example 2

Another composition containing a PAO-based thixotropic fluid according to the present invention is given, along with preferred useful ranges, as follows:

| Ingredient | Wt Percentage | Range |
| --- | --- | --- |
| Durasyn 168 (PAO Oil) | 69.99 | 20 to 90 |
| Kraton G1702 Diblock Polymer | 3.12 | 2 to 15 |
| Paracin 285 (fatty acid amide synthetic wax) | 4.68 | 0 to 12 |
| 091 DE plastic microballoons | 2.50* | 2 to 10 |
| Hostaflam 462 encapsulated Ammonium Polyphosphate | 8.78 | 5 to 30 |
| Pentaerythritol | 5.85 | 2 to 15 |
| CPVC (Chlorinated poly vinyl chloride plastic resin powder) | 4.88 | 0 to 20 |
| Liquipar (paraben biocide oil) | 0.20 | 0.1 to 0.5 |

*Approximately 45% by volume.

The overall density of the composition of Example 2 is about 0.55 g/cc, and the viscosity is 140,000 to 160,000 cps.

Example 3

A composition containing a polybutene-based thixotropic fluid according to the present invention is given, along with preferred useful ranges, as follows:

| Ingredient | Wt Percentage | Range |
| --- | --- | --- |
| Indopol L-14E (Polybutene oil) | 70.25 | 20 to 91 |
| Kraton G1702 Diblock Polymer | 4.24 | 2 to 15 |
| 091 DE plastic microballoons | 3.00* | 2 to 8 |
| Hostaflam 462 encapsulated Ammonium Polyphosphate | 14.08 | 5 to 30 |
| Pentaerythritol | 8.23 | 2 to 15 |
| Liquipar (paraben biocide oil) | 0.20 | 0.1 to 0.5 |

*Approximately 48% by volume.

The overall density of the composition of Example 3 is about 0.53 g/cc.

Example 4

A composition containing a polybutene based thixotropic fluid, without flame retardant, according to the present invention is given, along with preferred useful, as follows:

| Ingredient | Wt Percentage | Range |
| --- | --- | --- |
| Indopol L-14 (Polybutene oil) | 90.25 | 75 to 96 |
| Kraton G1702 Diblock Polymer | 5.25 | 2 to 15 |
| 091 DE plastic microballoons | 4.50* | 2 to 10 |

*Approximately 64% by volume.

The overall density of the composition of Example 4 is about 0.43 g/cc, and the 140,000 to 160,000 cps.

Example 5

A composition containing a dialkyl carbonate based thixotropic fluid according to the present invention is given, along with preferred useful ranges, as follows:

| Ingredient | Wt Percentage | Range |
| --- | --- | --- |
| MixOil 2201 (C15–17 Dialkyl Carbonate Oil) | 68.71 | 32 to 89 |
| Kraton G1702 Diblock Polymer | 5.78 | 2 to 15 |
| 091 DE plastic microballoons | 3.00* | 2 to 8 |
| Hostaflam 462 encapsulated Ammonium Polyphosphate | 14.08 | 5 to 30 |
| Pentaerythritol | 8.23 | 2 to 15 |
| Liquipar (paraben biocide oil) | 0.20 | 0.1 to 0.5 |

*Approximately 48% by volume.

The overall density of the composition of Example 5 is about 0.53 g/cc.

Example 6

A composition (with glass microballoons) containing a corn oil-based thixotropic fluid according to the present invention is, along with preferred useful ranges, as follows:

| Ingredient | Wt Percentage | Range |
| --- | --- | --- |
| Corn Oil | 49.34 | 20 to 91 |
| Vector 6001 Diblock Polymer | 3.08 | 2 to 15 |
| 3M K37 Glass Microballoons | 24.23* | 0 to 20 |
| Hostaflam 462 Encapsulated Ammonium Polyphosphate | 15.42 | 5 to 30 |
| Pentaerythritol | 7.71 | 2 to 15 |
| Liquipar (paraben biocide oil) | 0.25 | 0.1 to 0.5 |
| TBHQ Antioxidant | 0.05 | 0.02 to 0.1 |

*Approximately 40% by volume.

A lower level of glass microballoons was used to keep the viscosity at the desired level. The overall density of the composition of Example 6 is about 0.74 g/cc, and the viscosity is about 180,000–200,000 cps, measured using a Brookfield viscometer, spindle #7, at 20 RPMs.

Example 7

A composition (with plastic microballoons) containing a corn oil-based thixotropic fluid according to the present invention is given, along with preferred useful ranges, as follows:

| Ingredient | Wt Percentage | Range |
| --- | --- | --- |
| Corn Oil | 85.76 | 30 to 95 |
| Vector 6001 Diblock Polymer | 5.40 | 2 to 15 |
| 091 DE plastic microballoons | 2.21* | 0–10 |
| Hostaflam 462 Encapsulated Ammonium Polyphosphate | 4.07 | 2 to 30 |
| Pentaerythritol | 2.31 | 1 to 15 |
| Liquipar (paraben biocide oil) | 0.25 | 0.1 to 0.5 |
| TBHQ Antioxidant | 0.05 | 0.02 to 0.1 |

*Approximately 42% by volume.

The overall density of the composition of Example 7 is about 0.49 g/cc, and the viscosity is about 180,000–200,000 cps, measured using a Brookfield viscometer, spindle #7, at 20 RPMs.

Example 8

A preferred composition containing a canola oil-based thixotropic fluid according to the present invention is given, along with preferred useful ranges, as follows:

| Ingredient | Wt Percentage |
| --- | --- |
| Canola Oil | 84% |
| Paracin P285 | 5% |
| Vector 6030 Diblock Polymer | 5% |
| 091 DE plastic microballoons | 5%* |
| Composite biocide | 1% |
| TBHQ Antioxidant | 0.05 |

*Approximately 63% by volume.

The overall density of the formulation Example 8 is about 0.40 g/cc, and the viscosity is about 180,000–200,000 cps, measured using a Brookfield viscometer, spindle #7, at 20 RPMs.

Example 9

A most preferred composition containing a canola oil-based thixotropic fluid according to the present invention is given, along with preferred useful ranges, as follows:

| Ingredient | Wt Percentage |
| --- | --- |
| Hydrogenated/Fractionated Canola Oil | 84% |
| Paracin P285 | 4.5% |
| Silicone Oil | 0.5% |
| Vector 6030 Diblock Polymer | 5% |
| 091 DE plastic microballoons | 5%* |
| Composite biocide | 1% |
| TBHQ Antioxidant | 0.05 |

*Approximately 63% by volume.

The overall density of the formulation Example 9 is about 0.4 g/cc, and the viscosity is about 180,000–200,000 cps, measured using a Brookfield viscometer, spindle #7, at 20 RPMs.

Example 10

A composite biocide formulation which has proven effective, especially in vegetable oil formulations, and which was used in the formulations of Examples 8, 9, 11, 13 and 14, is as follows:

| Biocide | Concentration |
| --- | --- |
| methyl paraben | 20% |
| Liqupar oil | 20% |
| isopropyl paraben | |
| butyl paraben | |
| isobutyl paraben | |
| EDTA (ethylenedinitrilo-tetraacetic disodium salt) | 20% |
| benzalkonium chloride | 10% |
| phenoxyethanol | 30% |

Example 11

Another composition containing a canola oil-based thixotropic fluid according to the present invention is as follows:

| Ingredient | Wt Percentage |
| --- | --- |
| Hydrogenated/Fractionated canola oil | 81.5% |
| Paracin P285 | 5% |
| Silicone oil | 2% |
| Vector 6030 Diblock Polymer | 5% |
| 091 DE plastic microballoons | 5%* |
| Antioxidant (see Example 12, below) | <0.5% |
| Composite biocide | 1% |

*Approximately 63% by volume.

The overall density of the formulation Example 11 is about 0.40 g/cc.

Example 12

The several antioxidants listed below were tested for use in compositions containing hydrogenated/fractionated canola oil-based thixotropic fluids according to the present invention. Each of the antioxidants are approximately interchangeable in the compositions based on the hydrogenated/fractionated canola oil fluids.

| Antioxidant | Preferred amount | Useable range |
| --- | --- | --- |
| BHA/BHT | 0.15% | 0.05–0.3% |
| MT-70, tocopherols, UOP | 0.18% | 0.05–0.3% |
| MT-AP, tocopherols & ascorbyl palmitate, UOP | 0.06% | 0.02–0.2% |
| TBHQ | 0.01% | 0.005–0.1% |

Example 13

Another composition containing a canola oil-based thixotropic fluid according to the present invention is as follows:

| Ingredient | Wt Percentage |
| --- | --- |
| Hydrogenated/Fractionated canola oil | 72% |
| AC405 T, Allied Signal | 6% |
| Silicon Oil | 10% |
| Vector 6030 Diblock Polymer | 6% |
| 091 DE plastic microballoons | 4.5%* |
| Antioxidant (see Example 12) | <0.5% |
| Composite biocide | 1% |

*Approximately 63% by volume.

The overall density of the formulation Example 13 is about 0.40 g/cc.

Example 14

Another composition containing a canola oil-based thixotropic fluid according to the present invention is as follows:

| Ingredient | Wt Percentage |
| --- | --- |
| Hydrogenated/Fractionated canola oil | 72.25% |
| AC405 T, Allied Signal | 6% |
| Silicon Oil | 10% |
| Vector 6030 Diblock Polymer | 6% |
| 091 DE plastic microballoons | 4.25%* |
| Antioxidant (see Example 12) | <0.5% |
| Composite biocide | 1% |

*Approximately 63% by volume.

The overall density of the formulation Example 14 is about 0.40 g/cc.

Test Results

The following are separation test results comparing compositions substantially as disclosed in U.S. Pat. No. 4,588,229 to Jay and U.S. Pat. No. 5,362,543 to Nickerson with the PAO composition of Example 1, according to the present invention.

TABLE 10

| Test Conditions | Jay '229 Comp. | Nickerson '543 comp. | PAO comp |
| --- | --- | --- | --- |
| 55° C., 3 Months (1) | 3 days-Large qty oil Sep (2) | 28 days-Small qty oil Sep. | 3 mo-No oil sep. |
| 65° C., 3 Months | 3 days-Large qty oil Sep | 28 days-Small qty oil Sep. | 3 mo-No oil sep. |
| 79° C., 3 Months | 1 day-Large qty oil Sep | 14 days-Small qty oil Sep. | 3 mo-No oil sep. (3) |
| 0 to 55° C., 30 cycles, 24 hr/cycle | 3 days-Large qty oil Sep | No sep. observed | No sep. observed |
| Blender Test (4) | Den = +7.0% Vis = −22% | Den = +4.8% Vis = −28% | Den = +2.8% Vis = −4.2% |
| Cal 133 Flame Test (5) | No Self Extinguish | −0.5% - 4 minutes, 15 seconds | −3.2% - 4 minutes, 24 seconds |

(1) Test Criteria: Small quantities of separation are acceptable. Approximately 0.5% of total material weight.
(2) Time until first observed oil separation.
(3) Test extended to 1 year. No oil separation. No change in viscosity. No hardening of material. No color change.
(4) Test performed using a Sunbeam Mixmaster Model #2360, or equivalent blender, with standard beater bars, speed setting at lowest on dial. Sample size approximately 12 fl oz. Test duration is 8 hours continuous run. Comparative test results only. Looking for minimal change in viscosity and density. Den = Density change. Vis = Viscosity change.
(5) 10% max weight loss. Test duration: 60 minutes. Weight loss and time to extinguish reported.

The compositions of the present invention are superior to prior art products for the following reasons:

a) The composition of the present invention is stable in that it does not significantly separate when exposed to body temperatures of about 95° F. to 100° F. for extended periods. (i.e., 6 months or more).

b) The composition of the present invention does not pose a significant skin sensitization or irritation potential.

c) The composition of the present invention has a much lower flammability when tested by the Cal 133 requirements or other relevant flame tests.

d) The composition of the present invention has a much higher viscosity index i.e. the viscosity in stable over a range of temperatures, as compared to prior art compositions.

e) The composition of the present invention does not stiffen to unacceptably high viscosities when chilled to low temperatures (40° F. approximate).

f) When placed into a bladder and cycled repeatedly through a simulated seat cushion use test (mechanical "butt" test), the composition of the present invention will not form any evidence of hard lumps.

g) When placed into a seat cushion bladder and weighted with a static weight for long periods of time (simulating long sitting use by an inactive user), the composition of the present invention will not form any evidence of hard lumps.

h) The composition of the present invention has a low micro-organism growth potential and thereby has a low tendency to support the growth of micro-organisms such as mold and bacteria.

i) The composition of the present invention has a high LD50 threshold (low risk of poisoning upon ingestion).

j) No ingredients of the composition leach from or evaporate through the urethane film which is used for the envelope.

k) No ingredients of the composition are chemically reactive with the urethane film used for the envelope.

The forms of invention shown and described herein are to be considered only as illustrative. It will be apparent to those skilled in the art that numerous modifications may be made therein without departing from the spirit of the invention and the scope of the appended claims.

We claim:

1. A pressure compensating padding device comprising a flexible envelope and a deformable composition within said envelope; wherein said composition deforms in response to continuously applied pressure, but tends to maintain its shape and position in the absence of applied pressure; said composition comprising a fluid formed from a mixture of a PAO oil and a thickener, wherein said composition maintains its fluid characteristics.

2. A pressure compensating padding device comprising a flexible envelope and a deformable composition within said envelope; wherein said composition deforms in response to continuously applied pressure, but tends to maintain its shape and position in the absence of applied pressure;
said composition comprising a fluid formed from a mixture of a polybutene oil and a thickener, wherein said composition maintains its fluid characteristics.

3. A pressure compensating padding device comprising a flexible envelope and a deformable composition within said envelope; wherein said composition deforms in response to continuously applied pressure, but tends to maintain its shape and position in the absence of applied pressure;
said composition comprising a fluid formed from a mixture of a dialkyl carbonate oil and a thickener, wherein said composition maintains its fluid characteristics.

4. A pressure compensating padding device comprising a flexible envelope and a deformable composition within said envelope; wherein said composition deforms in response to continuously applied pressure, but tends to maintain its shape and position in the absence of applied pressure;
said composition comprising a fluid formed from a mixture of at least two incompatible oils and a thickener, wherein said composition maintains its fluid characteristics.

5. A pressure compensating padding device comprising a flexible envelope and a deformable composition within said envelope; wherein said composition deforms in response to continuously applied pressure, but tends to maintain its shape and position in the absence of applied pressure;
said composition comprising a fluid formed from a mixture of at least one oil, a compatible thickener and a supplemental thickener which is incompatible with all of said oils, wherein said composition maintains its fluid characteristics.

6. A pressure compensating padding device comprising a flexible envelope and a deformable composition within said envelope; wherein said composition deforms in response to continuously applied pressure, but tends to maintain its shape and position in the absence of applied pressure;
said composition comprising a viscous fluid formed from a mixture of an oil and a block polymer;
said block polymer having at least one block which has a relatively low affinity for said oil and having at least one block which has a relatively high affinity for said oil, wherein said composition maintains its fluid characteristics.

7. The pressure compensating padding device as defined by claim 6, wherein said fluid is a non-Newtonian fluid.

8. The pressure compensating padding device as defined by claim 6, wherein said fluid is thixotropic.

9. The pressure compensating padding device as defined by claim 6, wherein said fluid is a Bingham fluid.

10. The pressure compensating padding device as defined by claim 6, wherein said fluid is a rheopectic fluid.

11. The pressure compensating padding device as defined by claim 6, wherein said oil is selected from the group consisting of PAO oil, polybutene oil, dialkyl carbonate oil and mixtures thereof.

12. The pressure compensating padding device as defined by claim 6, wherein said thickener is selected from the group consisting of block polymers and mixtures of block polymers and supplemental thickeners.

13. The pressure compensating padding device as defined by claim 12, wherein said supplemental thickener is a wax thickener.

14. The pressure compensating padding device as defined by claim 12, wherein said supplemental thickener is a non-wax thickener.

15. The pressure compensating padding device as defined by claim 12, wherein said supplemental thickener is a mixture of a wax thickener and a non-wax thickener.

16. A pressure compensating padding device comprising a flexible envelope and a deformable composition within said envelope; wherein said composition deforms in response to continuously applied pressure, but tends to maintain its shape and position in the absence of applied pressure; said composition comprising an oil and an intumescent flame retardant, wherein said composition maintains its fluid characteristics.

17. A pressure compensating padding device comprising a flexible envelope and a deformable composition within said envelope; wherein said composition deforms in response to continuously applied pressure, but tends to maintain its shape and position in the absence of applied pressure; said composition comprising: a fluid formed from a mixture of a major amount of an oil and a minor amount of a block polymer; said block polymer having at least one block which has a relatively low affinity a for said oil and having at least one block which has a relatively high affinity for said oil, wherein said composition maintains its fluid characteristics.

18. The pressure compensating padding device as defined by claim 17, wherein said fluid is formed from a mixture of about 80 to 98 parts by weight of said oil and from about 2 to 20 parts by weight of said block polymer.

19. The pressure compensating padding device as defined by claim 17, wherein said block polymer has at least one polystyrene block.

20. The pressure compensating padding device as defined by claim 17, wherein said block polymer has at least one elastomeric block.

21. The pressure compensating padding device as defined by claim 17, wherein said block polymer is a diblock polymer.

22. The pressure compensating padding device as defined by claim 21, wherein said block polymer has at least one elastomeric block.

23. The pressure compensating padding device as defined by claim 21, wherein said block polymer has at least one polystyrene block.

24. The pressure compensating padding device as defined by claim 18, wherein said composition has dispersed therein up to 70 percent by volume of microballoons.

25. The pressure compensating padding device as defined by claim 24, wherein said microballoons are selected from the group consisting of glass microballoons and plastic microballoons.

26. The pressure compensating padding device as defined by claim 24, wherein said microballoons are plastic microballoons.

27. The pressure compensating padding device as defined by claim 17, wherein said composition includes a flame retardant.

28. The pressure compensating padding device as defined by claim 27, wherein said composition includes an intumescent flame retardant.

29. The pressure compensating padding device as defined by claim 27, wherein said flame retardant comprises a catalyst, a carbon source and a blowing agent.

30. The pressure compensating padding device as defined by claim 17 wherein said composition includes an supplemental thickener.

31. The pressure compensating padding device as defined by claim 30, wherein said supplemental thickener is an organic wax material which forms a distinct phase in said fluid.

32. The pressure compensating padding device as defined by claim 30, wherein said supplemental thickener is a wax selected from the group consisting of amide, polyethylene, copolymers of ethylene with acrylic acid or vinyl acetate, polypropylene, castor, and derivatives of castor, silica, clay and mixtures thereof.

33. The pressure compensating padding device as defined by claim 17, wherein said composition comprises a biocide.

34. The pressure compensating padding device as defined by claim 17, wherein said composition comprises an antioxidant.

35. The pressure compensating padding device as defined by claim 34, wherein said antioxidant comprises a silicone oil.

36. The pressure compensating padding device as defined by claim 17, wherein said oil is a saturated aliphatic oil selected from the group consisting of polyalphaolefin oils, polybutene oils, dialkyl carbonate oils and mineral oils.

37. The pressure compensating padding device as defined by claim 36, wherein said block polymer has at least one polystyrene block.

38. The pressure compensating padding device as defined by claim 36, wherein said block polymer has at least one poly(ethylene-propylene) block.

39. The pressure compensating padding device as defined by claim 36, wherein said block polymer is a diblock polymer.

40. The pressure compensating padding device as defined by claim 39, wherein said block polymer has at least one polystyrene block.

41. The pressure compensating padding device as defined by claim 39, wherein said block polymer has at least one poly(ethylene-propylene) block.

42. The pressure compensating padding device as defined by claim 36, wherein said composition has dispersed therein up to 70 percent by volume of microballoons.

43. The pressure compensating padding device as defined by claim 42, wherein said microballoons are selected from the group consisting of glass microballoons and plastic microballoons.

44. The pressure compensating padding device as defined by claim 42, wherein said microballoons are plastic microballoons.

45. The pressure compensating padding device as defined by claim 36, wherein said composition includes a flame retardant.

46. The pressure compensating padding device as defined by claim 45, wherein said composition includes an intumescent flame retardant.

47. The pressure compensating padding device as defined by claim 45, wherein said flame retardant comprises a catalyst, a carbon source and a blowing agent.

48. The pressure compensating padding device as defined by claim 36, wherein said composition includes an supplemental thickener.

49. The pressure compensating padding device as defined by claim 48, wherein said supplemental thickener is an organic wax material which forms a distinct phase in said fluid.

50. The pressure compensating padding device as defined by claim 48, wherein said supplemental thickener is a wax selected from the group consisting of consisting of amide, polyethylene, copolymers of ethylene with acrylic acid or vinyl acetate, polypropylene, castor, and derivatives of castor, silica, clay and mixtures thereof.

51. The pressure compensating padding device as defined by claim 36, wherein said oil is a polyalphaolefin oil.

52. The pressure compensating padding device as defined by claim 51, wherein said polyalphaolefin oil is a hydrogenated homopolymer of 1-decene.

53. The pressure compensating padding device as defined by claim 51, wherein said block polymer has at least one polystyrene block.

54. The pressure compensating padding device as defined by claim 51, wherein said block polymer has at least one poly(ethylene-propylene) block.

55. The pressure compensating padding device as defined by claim 51, wherein said block polymer is a diblock polymer.

56. The pressure compensating padding device as defined by claim 55, wherein said block polymer has at least one polystyrene block.

57. The pressure compensating padding device as defined by claim 55, wherein said block polymer has at least one poly(ethylene-propylene) block.

58. The pressure compensating padding device as defined by claim 51, wherein said composition has dispersed therein from about 20 to 70 percent by volume of microballoons.

59. The pressure compensating padding device as defined by claim 58, wherein said microballoons are selected from the group consisting of glass microballoons and plastic microballoons.

60. The pressure compensating padding device as defined by claim 58, wherein said microballoons are plastic microballoons.

61. The pressure compensating padding device as defined by claim 51, wherein said composition includes a flame retardant.

62. The pressure compensating padding device as defined by claim 61, wherein said composition includes an intumescent flame retardant.

63. The pressure compensating padding device as defined by claim 61, wherein said flame retardant comprises a catalyst, a carbon source and a blowing agent.

64. The pressure compensating padding device as defined by claim 51, wherein said composition includes an supplemental thickener.

65. The pressure compensating padding device as defined by claim 64, wherein said supplemental thickener is an organic wax material which forms a distinct phase in said fluid.

66. The pressure compensating padding device as defined by claim 64, wherein said supplemental thickener is a wax selected from the group consisting of consisting of amide, polyethylene, copolymers of ethylene with acrylic acid or vinyl acetate, polypropylene, castor, and derivatives of castor, silica, clay and mixtures thereof.

67. The pressure compensating padding device as defined by claim 17, wherein said oil is a vegetable oil selected from the group consisting of canola, olive, corn, safflower, rapeseed, sunflower, castor, soy, coconut, palm and mixtures thereof.

68. The pressure compensating padding device as defined by claim 67, wherein said block polymer has at least one polystyrene block.

69. The pressure compensating padding device as defined by claim 67, wherein said block polymer has at least one unsaturated elastomeric block.

70. The pressure compensating padding device as defined by claim 67, wherein said block polymer has at least one polybutadiene or isoprene block.

71. The pressure compensating padding device as defined by claim 67, wherein said block polymer is a diblock polymer.

72. The pressure compensating padding device as defined by claim 71, wherein said block polymer has at least one unsaturated elastomeric block.

73. The pressure compensating padding device as defined by claim 71, wherein said block polymer has at least one polybutadiene or isoprene block.

74. The pressure compensating padding device as defined by claim 71, wherein said block polymer has at least one polystyrene block.

75. The pressure compensating padding device as defined by claim 67, wherein said composition has dispersed therein up to 70 percent by volume of microballoons.

76. The pressure compensating padding device as defined by claim 75, wherein said microballoons are selected from the group consisting of glass microballoons and plastic microballoons.

77. The pressure compensating padding device as defined by claim 75, wherein said microballoons are plastic microballoons.

78. The pressure compensating padding device as defined by claim 67, wherein said composition includes a flame retardant.

79. The pressure compensating padding device as defined by claim 78, wherein said composition includes an intumescent flame retardant.

80. The pressure compensating padding device as defined by claim 78, wherein said flame retardant comprises a catalyst, a carbon source and a blowing agent.

81. The pressure compensating padding device as defined by claim 67, wherein said composition includes an supplemental thickener.

82. The pressure compensating padding device as defined by claim 81, wherein said supplemental thickener is an organic wax material which forms a distinct phase in said fluid.

83. The pressure compensating padding device as defined by claim 81, wherein said supplemental thickener is a wax selected from the group consisting of amide, polyethylene, copolymers of ethylene with acrylic acid or vinyl acetate, polypropylene, castor, and derivatives of castor, silica, clay and mixtures thereof.

84. The pressure compensating padding device as defined by claim 67, wherein said composition comprises a biocide.

85. The pressure compensating padding device as defined by claim 67, wherein said composition comprises an antioxidant.

86. The pressure compensating padding device as defined by claim 67, wherein said antioxidant comprise a silicone oil.

87. The pressure compensating padding device as defined by claim 67, wherein said oil is a vegetable oil selected from the group consisting of canola oil, hydrogenated canola oil and fractionated canola oil.

88. The pressure compensating padding device as defined by claim 87, wherein said composition deforms in response to continuously applied pressure, but tends to maintain its shape and position in the absence of applied pressure.

89. The pressure compensating padding device as defined by claim 87, wherein said block polymer has at least one polystyrene block.

90. The pressure compensating padding device as defined by claim 87, wherein said block polymer has at least one unsaturated elastomeric block.

91. The pressure compensating padding device as defined by claim 87, wherein said block polymer has at least one polybutadiene or isoprene block.

92. The pressure compensating padding device as defined by claim 87, wherein said block polymer is a diblock polymer.

93. The pressure compensating padding device as defined by claim 92, wherein said block polymer has at least one unsaturated elastomeric block.

94. The pressure compensating padding device as defined by claim 92, wherein said block polymer has at least one polybutadiene or isoprene block.

95. The pressure compensating padding device as defined by claim 92, wherein said block polymer has at least one polystyrene block.

96. The pressure compensating padding device as defined by claim 87, wherein said composition has dispersed therein up to 70 percent by volume of microballoons.

97. The pressure compensating padding device as defined by claim 96, wherein said microballoons are selected from the group consisting of glass microballoons and plastic microballoons.

98. The pressure compensating padding device as defined by claim 96, wherein said microballoons are plastic microballoons.

99. The pressure compensating padding device as defined by claim 96, wherein said composition includes a flame retardant.

100. The pressure compensating padding device as defined by claim 99, wherein said composition includes an intumescent flame retardant.

101. The pressure compensating padding device as defined by claim 99, wherein said flame retardant comprises a catalyst, a carbon source and a blowing agent.

102. The pressure compensating padding device as defined by claim 87, wherein said composition includes an supplemental thickener.

103. The pressure compensating padding device as defined by claim 102 wherein said supplemental thickener is an organic wax material which forms a distinct phase in said fluid.

104. The pressure compensating padding device as defined by claim 102, wherein said supplemental thickener is a wax selected from the group consisting of consisting of amide, polyethylene, copolymers of ethylene with acrylic acid or vinyl acetate, polypropylene, castor, and derivatives of castor, silica, clay and mixtures thereof.

105. The pressure compensating padding device as defined by claim 87, wherein said composition comprises a biocide.

106. The pressure compensating padding device as defined by claim 87, wherein said composition comprises an antioxidant.

107. The pressure compensating padding device as defined by claim 87, wherein said composition comprises an antioxidant.

108. The pressure compensating padding device as defined by claim 107, wherein said antioxidant comprises a silicone oil.

\* \* \* \* \*